No. 777,993. PATENTED DEC. 20, 1904.
J. F. WILKINSON.
STARTING CLUTCH.
APPLICATION FILED MAR. 30, 1904.
NO MODEL. 2 SHEETS—SHEET 1.
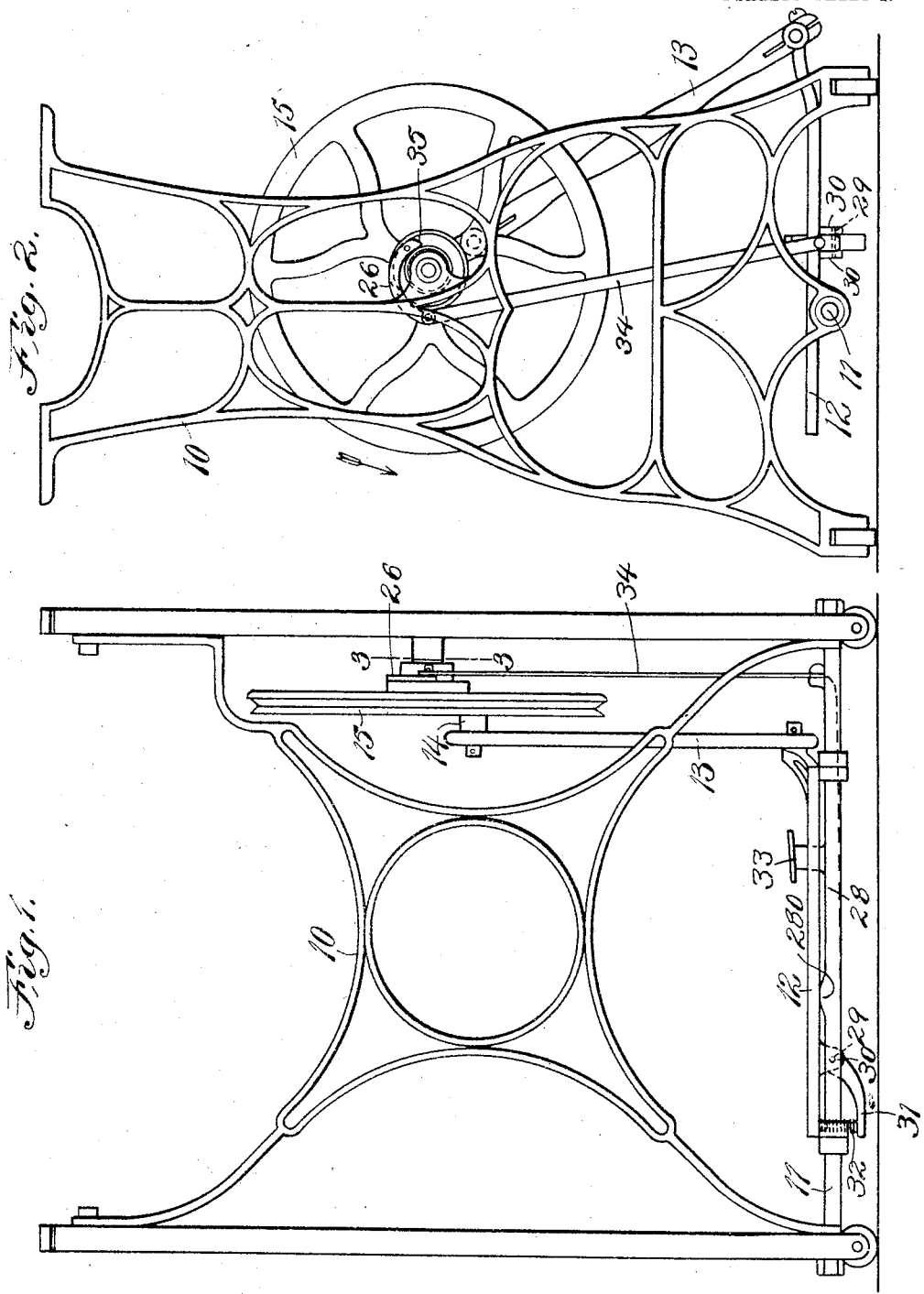
WITNESSES:
INVENTOR:
J. F. Wilkinson No. 777,993. PATENTED DEC. 20, 1904.
J. F. WILKINSON.
STARTING CLUTCH.
APPLICATION FILED MAR. 30, 1904.
NO MODEL. 2 SHEETS—SHEET 2.
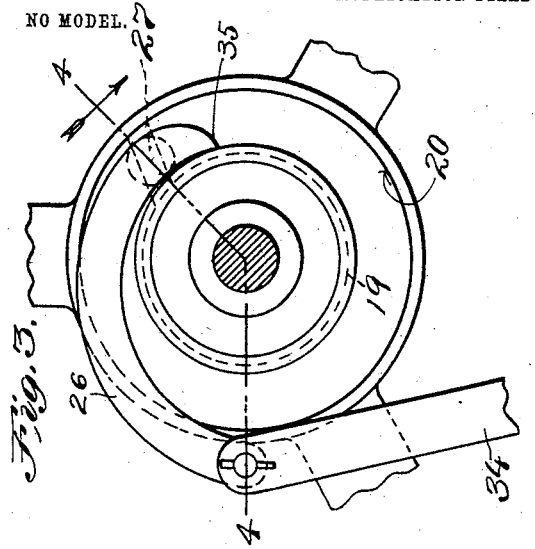
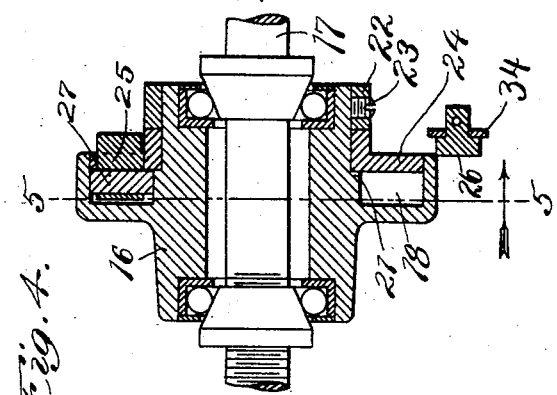
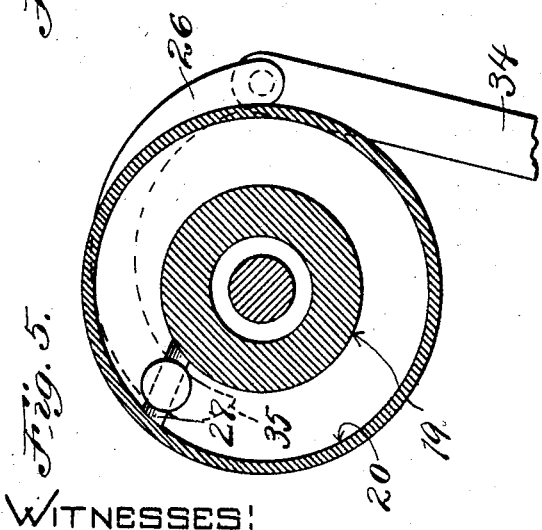
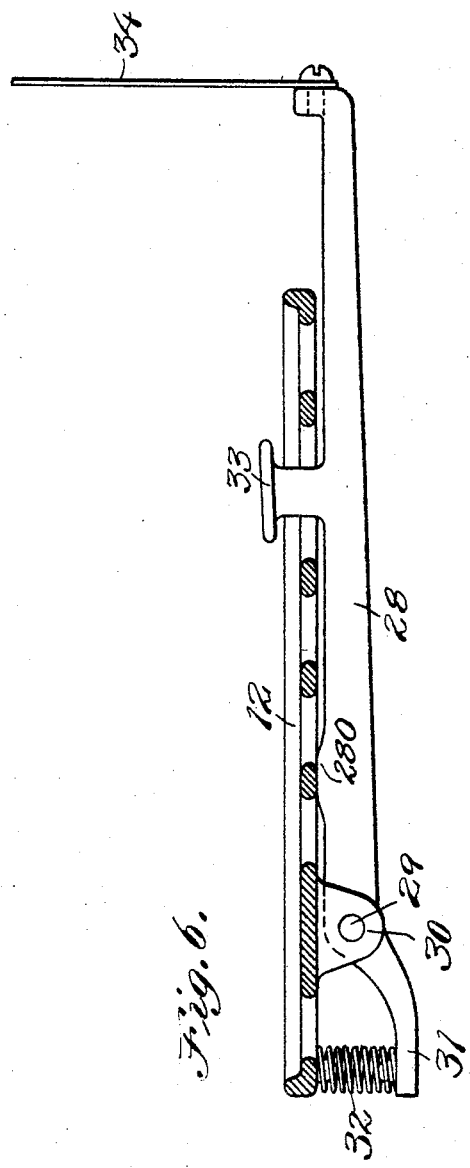
WITNESSES: INVENTOR:
J. F. Wilkinson No. 777,993.

Patented December 20, 1904.

UNITED STATES PATENT OFFICE.

JOHN F. WILKINSON, OF GLOUCESTER, MASSACHUSETTS.

STARTING-CLUTCH.

SPECIFICATION forming part of Letters Patent No. 777,993, dated December 20, 1904.

Application filed March 30, 1904. Serial No. 200,721.

*To all whom it may concern:*

Be it known that I, JOHN F. WILKINSON, of Gloucester, in the county of Essex and State of Massachusetts, have invented certain new and useful Improvements in Starting-Clutches, of which the following is a specification.

This invention has for its object to produce an improved device for machines employing a treadle mechanism for throwing the crank off of a dead-center and for starting the driving-wheel in the proper direction when the treadle is operated and preventing it from rotating in the wrong direction.

A further object of the invention is to provide an improved clutch mechanism which, while particularly designed for use in connection with a treadle mechanism such as above mentioned, may be employed for many other purposes and in connection with mechanisms widely varying from those illustrated in the accompanying drawings.

In Letters Patent No. 592,577, granted to me October 26, 1897, I have shown, described, and claimed a treadle attachment provided with a clutch and comprising a construction which allows the driving-wheel and the crank-shaft to revolve freely in one direction, the clutch locking it against rotating in the opposite direction. By said construction when a supplemental treadle is depressed, even though the pitman and the crank are on a dead-center, it will start the shaft in the direction desired far enough for the treadle to revolve the driving-wheel when said treadle is depressed. In such structure the driving-shaft will at no time be allowed to rotate in the wrong direction, and upon starting the machine to work the driving-shaft is given its initial movement without the help of the hands, which is generally given to the rotating parts of machines which are not provided with attachments of this nature. My present invention is shown in the accompanying drawings as relating to the same character of mechanism as in said patent, and the general operation is the same. The particular improvements herein claimed relate to the clutch and the supplemental treadle, as I shall presently describe.

My improved clutch is adapted to many uses, and when used in connection with a treadle and supplemental treadle, as hereinafter described, is adapted to be used in connection with a machine of any pattern or class employing a treadle and driving-wheel. Chiefly for convenience of illustration I have shown the present invention as applied to the driving mechanism of a sewing-machine.

Of the accompanying drawings, forming a part of this specification, Figure 1 represents a front elevation of a sewing-machine frame having my improved mechanism supported thereby. Fig. 2 represents a side elevation looking from the right in Fig. 1. Fig. 3 represents a detail section, enlarged, on the line 3 3 of Fig. 1. Fig. 4 represents a section on line 4 4 of Fig. 3. Fig. 5 represents a section on line 5 5 of Fig. 4. Fig. 6 represents a detail section through the treadle, said section being on a line so as to represent the supplemental treadle and its lever in elevation.

Similar reference characters indicate the same or similar parts throughout the several views.

The frame 10 of the machine is provided with the usual shaft or rod 11 at the base, on which rod the treadle 12 is pivoted in an ordinary manner. The treadle 12 is connected, by means of a pitman-rod 13, with the crank 14 of the driving-wheel 15. The hub 16 of the driving-wheel (see particularly Fig. 4) is mounted on a stud-shaft 17, projecting from the frame, suitable antifriction-bearings being employed. So far as described the construction embodies nothing which I claim as novel. One side of the hub is machined out to form a circular chamber 18, of which the inner wall is indicated at 19 and the outer wall at 20. Said two walls are of course concentric, and they form the two faces between which the clutch-bar is located, as will be presently described. The hub 16 is formed with a shoulder 21, and a collar 22 is secured upon the end of the hub by suitable means, such as a set-screw 23. Mounted on the hub so as to freely oscillate thereon is the clutch-ring 24, said ring being held in proper position between the shoulder 21 and collar 22. A stud 25, having an arm 26, is mounted in an opening in the ring 24, said stud projecting into the chamber 18, but not far enough so that the end of the stud will come in contact with the bottom of the said chamber. The shoulder 21 prevents the clutch-ring from moving laterally, so as to permit of any friction of the end of the stud 25 with the bottom of said chamber, as clearly indicated in Fig. 4. The stud 25 is formed with an aperture, preferably circular in cross-section, in which aperture the clutch-dog 27 is loosely mounted. The angle at which the aperture is formed in the stud, and consequently the angle which the clutch-dog will present to the clutch-faces 19 and 20, is such that it may be described as between a radius and a tangent of either of said clutch-faces. The ends of the clutch-dog are beveled, so as to fit the concentric clutch-surfaces 19 and 20, such fit being rendered absolutely certain and accurate in spite of any possible variations in the surfaces 19 and 20, owing to the looseness of the clutch-dog in the aperture of the stud.

I shall now proceed to describe the means and connections whereby the clutch serves to prevent any possibility of the crank 14 getting on a dead-center, said clutch serving to start the crank over or beyond such dead-center, if it should rest at that point.

A lever 28 is pivoted at 29 to ears 30, which extend downward from the treadle 12. Said lever 28 extends underneath the treadle and is provided with a heel 31, between which and the under side of one edge of the treadle a spring 32 is interposed, said spring having a tendency to normally hold the lever 28 in the position shown in Fig. 6. Said lever is provided, however, with a foot-piece 33, which projects through an open portion of the treadle 12 in position where the said piece 33 may be depressed by the foot of the operator. Such depression of the piece 33, and consequently of the lever 28, against the action of the spring 32 causes the clutch-arm 26 to be drawn downward, a link 34 connecting the end of the lever 28 with the end of said arm 26. Of course the lever 28 being carried by the treadle 12 will be constantly moved up and down slightly with the motions of the treadle, and this motion of the lever 28 will be transmitted through the link 34 to the arm 26; but since this motion of the lever 28 and arm 26 can only be taking place when the treadle 12 is causing the driving-wheel 15 to rotate the movement of the clutch-ring, although an oscillating one, will not interfere with the rotation of the wheel-hub. This is because when the clutch-ring is moving in the same direction as the wheel, such direction being indicated by the arrow in Fig. 2, the lever 26 is drawn downward and serves to cause the ends of the clutch-dog to engage the concentric clutch-faces. However, when the clutch-ring is oscillated in a direction opposite to the movement of rotation of the driving-wheel or if at any time during the opposite movement of the clutch-ring the driving-wheel is moving faster than the clutch-ring, the concentric clutch-faces will simply slip over the beveled ends of the clutch-dog. The positions of the parts represented in Figs. 2 and 3 will clearly show that no matter what might be the position of the pitman-rod 13 and crank 14, whether on a dead-center or not, the pressure of the operator's foot upon the projection 33 of the supplemental treadle will cause a pull upon the outer end of the arm 26, which will force the clutch-dog to bind between the inner and outer concentric clutch-faces 19 and 20, and therefore start the rotation of the driving-wheel. At the same time it will be obviously impossible to start the driving-wheel in the wrong direction, for the reason that the same binding of the clutch-dog which enables it to give a starting movement to the driving-wheel will act as a clutch to prevent movement of the driving-wheel in the wrong direction. By referring particularly to Fig. 3 it will be seen that the arm 26 of the clutch-dog-carrying stud is extended forward of said stud and formed with a toe 35, which rests upon the hub of the clutch-carrying disk or ring and prevents any loose motion further than enough to permit the release of the clutch.

It will be readily understood that when released the grip of the clutch is absolutely frictionless, while at the same time the grip is absolutely rigid when it is engaged. It is also entirely noiseless in operation, and although particularly well adapted for a treadle-starting mechanism it is readily adaptable to many other uses.

If it should be desired to equip a machine in which the driving-shaft rotates in the opposite direction with my improvement, the clutch is merely reversed, as will be readily understood. I desire also to mention that I do not limit myself to the precise arrangement of the connections, even when employed as treadle mechanism, since the parts may be varied in location and formed to suit any particular style of treadle.

The lever 28 is formed with a shoulder or upward extension 280, adapted to contact with the under surface of a portion of the treadle 12 before the outer end of said lever 28 could strike the under side of said treadle. This prevents the noise that would result if the end of the lever 28 were free to strike the treadle 12.

I do not limit myself to the loose mounting of the dog 27 in the stud 25, although such loose mounting is preferable because it compensates for any slight irregularities in the faces 19 and 20. It is obvious, however, that the advantages of a dog adapted to oscillate between two opposed concentric faces forming the outer and inner walls of a continuous groove or circular way would be obtained if the dog were rigidly affixed to the stud instead of being adapted to slip endwise therein.

Having thus explained the nature of the invention and described a way of constructing and using the same, although without having attempted to set forth all the forms in which it may be embodied or all the modes of its use, I declare that what I claim is—

1. In mechanism of the character specified, a clutch comprising two members, one of which is provided with inner and outer concentric faces, and the other comprising a stud mounted to oscillate, and a dog extending through the stud and having its ends adapted to bind on the said inner and outer faces.

2. In mechanism of the character specified, a clutch comprising two members, one of which is provided with inner and outer concentric faces, and the other comprising a stud mounted to oscillate, and a dog extending through the stud and having its ends adapted to bind on the said inner and outer faces, the said dog being loosely mounted in the stud.

3. A clutch comprising a hub member having inner and outer concentric faces, a ring mounted to oscillate on said hub, a stud mounted in said ring, a dog mounted in said stud at an angle, and means for simultaneously oscillating said dog and ring.

4. A clutch comprising a hub member having inner and outer concentric faces, a ring mounted to oscillate on said hub, a stud mounted in said ring and having an angular aperture, a dog having beveled ends loosely fitting said aperture and adapted to bind against the said concentric faces, said stud having an arm, and means for oscillating said arm.

5. A treadle mechanism comprising a driving-wheel, a crank, a pitman, a treadle, the latter having a supplemental treadle movable relatively to it, inner and outer concentric faces formed in the hub of the driving-wheel, an angularly-mounted clutch-dog between said inner and outer faces, means for changing the angle of said dog, and connections whereby said angle of the dog may be changed by movements of the supplemental treadle relatively to the main treadle.

6. The combination with the driving-wheel having its hub formed with inner and outer concentric clutch-faces, of a crank, pitman, and treadle for rotating said driving-wheel, a ring mounted to oscillate on said hub, a stud mounted in said ring, a loose clutch-dog carried by said stud and adapted to engage said inner and outer clutch-faces, an arm extending from said stud, a supplemental treadle connected with the operating-treadle, and a link connecting said supplemental treadle with the arm of the clutch-dog.

In testimony whereof I have affixed my signature in presence of two witnesses.

JOHN F. WILKINSON.

Witnesses:
  N. W. HARRISON,
  R. M. PIERSON.